United States Patent [19]
Gibbs

[11] Patent Number: 5,921,203
[45] Date of Patent: *Jul. 13, 1999

[54] ROTATING AQUARIUM

[76] Inventor: Mitchell W. Gibbs, 3339 Beverly Ct., Bowling Green, Ky. 42104

[ * ] Notice: This patent is subject to a terminal disclaimer.

[21] Appl. No.: 08/924,568

[22] Filed: Sep. 5, 1997

Related U.S. Application Data

[63] Continuation-in-part of application No. 08/692,013, Aug. 2, 1996, Pat. No. 5,704,313.

[51] Int. Cl.[6] ................................................ A01K 63/04
[52] U.S. Cl. ........................... 119/248; 119/261; 119/253
[58] Field of Search ................................. 119/248, 247, 119/260, 267, 253, 256, 269; 40/406, 407; D30/101, 106; 366/167.1, 175.1, 170.1, 44, 54, 55; 494/65

[56] References Cited

U.S. PATENT DOCUMENTS

| | | | |
|---|---|---|---|
| 925,209 | 6/1909 | Livermore . | |
| 1,634,305 | 7/1927 | Schrimp | 119/267 |
| 1,745,649 | 2/1930 | Stanford et al. | 40/407 |
| 2,536,423 | 1/1951 | Cohen et al. | 494/65 |
| 2,648,496 | 8/1953 | Cresswell | 494/65 |
| 2,723,079 | 11/1955 | Fulton et al. | 494/65 X |
| 3,580,546 | 5/1971 | Fraser et al. | 366/136 |
| 3,655,272 | 4/1972 | Valadez | 359/798 |
| 3,706,299 | 12/1972 | Hendges | 119/266 |
| 3,807,356 | 4/1974 | Pratt | 119/247 |
| 3,991,935 | 11/1976 | Henning | 494/65 X |
| 4,044,721 | 8/1977 | Foley et al. | 119/248 |
| 4,120,265 | 10/1978 | Davis | 119/248 |
| 4,323,032 | 4/1982 | Halfon | 119/248 |
| 4,430,071 | 2/1984 | Willus et al. . | |
| 4,481,905 | 11/1984 | Fonseca . | |
| 5,076,210 | 12/1991 | Horn | 119/203 |
| 5,189,982 | 3/1993 | Liu | 119/247 |

*Primary Examiner*—Jack W. Lavinder
*Assistant Examiner*—Yvonne R. Abbott
*Attorney, Agent, or Firm*—Waddey & Patterson; Edward D. Lanquist, Jr.

[57] ABSTRACT

A rotating aquarium for use with live fish and particularly live corals including a canopy with light fixtures, a tank having a central core, a turntable including an electric motor for rotating the tank and a base for supporting the tank. The central core includes an electrical conduit for transporting electrical wires to the light fixture in the canopy. The central core also includes a water pipe that is connected to a reservoir mounted within the base of the aquarium. The reservoir includes a pump that circulates water throughout the aquarium. The tank rotates about the central core via the turntable and the electric motor. As the tank rotates, the fish and living coral receive light at different angles and receive superior water circulation. The aquarium of this invention therefore provides an environment more like the ocean for the animals living therein.

23 Claims, 6 Drawing Sheets

ROTATING AQUARIUM

This is a continuation-in-part application of U.S. patent application Ser. No. 08/692,013 filed on Aug. 2, 1996, now U.S. Pat. No. 5,704,313.

BACKGROUND OF THE INVENTION

The present invention relates generally to the keeping of live aquatic creatures for pleasure, relaxation or scientific study and to aquariums and more particularly to a rotating aquarium as intended to facilitate the keeping of such aquatic creatures.

The ocean, due to its great volume, is nutrient poor. In order for coral animals to survive in this nutrient poor environment, they evolved with zooxanthellae (tiny plants) that live inside them in a symbiotic relationship. Through photosynthesis, the zooxanthellae produce food for the host coral and they receive nitrogen, phosphorous and carbon dioxide in return. When corals do not receive enough light, the zooxanthellae can die and the coral will turn white or bleach as a result. This often leads to the death of the corals as well. Delbeek, J. Charles; Sprung, Julian; *The Reef Aquarium*, 1994 (Ricordea Publishing).

While the keeping of tropical fish is certainly not a new hobby, the successful captive maintenance of the living coral reefs is a very recent variation. The natural environment must be recreated as much as possible. A common problem associated with the keeping of corals, such as stony corals (species *acropora*), is coral bleaching. As described above, coral bleaching is partial depigmentation caused by the death of zooxanthellae from inadequate light. In nature, the earth rotates on its axis and revolves around the sun. The coral receives sunlight from many angles when the earth rotates about its axis. This exposure to sunlight, and particularly to sunlight at different angles, prevents coral bleaching.

Additionally, in the ocean, sedentary corals receive food and waste removal through the constant water movement from currents and wave action. This enables the coral to grow and prosper in the ocean setting.

In a conventional stationary aquarium with a fixed light source, corals can actually shade themselves as the upper branches block light from reaching the lower branches. Further, coral tend to grow toward the fixed light source in a conventional aquarium. Faster growing coral species can thus obscure the light source to slower growing coral species within the aquarium. This can cause non-uniform coral growth. Both of these phenomena, i.e. shading cause by the corals' own branches or shading caused by faster growing coral species, result in coral bleaching, where zooxanthellae die from inadequate light. Further, in the conventional aquarium, corals can literally smother from pollution from their own wastes in areas of inadequate water movement.

In conventional aquariums, water movement can be created using pumps. However, there are usually dead spots or at least areas with little water movements. Moreover, in attempting to create adequate water movement, multiple pumps are used. These pumps produce heat which results in increased temperatures and causes a problem in regulating the environment of the aquarium to the appropriate temperature. Finally, another disadvantage of conventional aquariums is that they are only viewed by the user from one angle. Even if the conventional aquarium is landscaped, or aquascaped, to provide different views, the user cannot appreciate the different views of the aquarium without moving from his or her vantage point. This is a particular disadvantage for a tank that includes corals.

What is needed, then, in the prior art is a rotating aquarium that can provide adequate lighting from many angles and can facilitate water transfer. Such an aquarium is lacking in the prior art. This needed system must also be capable of reversing direction manually or automatically through use of a timer.

SUMMARY OF THE INVENTION

It is an object of this invention to provide a rotating aquarium that can support living aquatic creatures.

It is a further object of this invention to provide a rotating aquarium that includes a light source, or multiple light sources, so that aquatic creatures living within the aquarium can be exposed to lighting at different angles.

It is another object of this invention to provide for the uniform growth of creatures within the aquarium by exposing them to light at different angles.

It is yet a further object of this invention to provide a rotating aquarium that can facilitate water movement around the aquatic creatures to ensure adequate waste removal and nutrient provision.

It is still a further object of this invention to provide a rotating aquarium that can provide a different look to the viewer as the aquarium rotates.

It is yet a further object of this invention to provide a rotating aquarium that includes walls that divide the tank of the aquarium into compartments.

A further object of the present invention is to provide a system of reversing the rotation of the aqaurium.

Accordingly, an aquarium comprising a tank; means for rotating the tank; light projection means for projecting light into the tank as it is rotated; and means for circulating water throughout the tank is described. Preferably, the means for rotating the tank comprises a turntable that is driven by an electric motor.

The light projection means can comprise a light fixture mounted on top of the tank. Preferably, multiple light fixtures are mounted on top of the tank. The means for circulating the water through the tank can comprise a pump and at least two water lines, the first water line transmitting water from the tank to the pump and the second water line transmitting water from the pump to the tank. In this case, the means for circulating the water throughout the tank can further comprises a reservoir, and the first water line is connected to the reservoir. The pump can be mounted within the reservoir or externally to the reservoir.

The aquarium of this invention can further include walls mounted within the tank of the aquarium that divide the aquarium into compartments. Preferably, the walls are oriented such that the means for circulating water functions for all compartments.

In the aquarium of this invention, the tank can include a central core, the central core including a water pipe and an electrical conduit, the electrical conduit bearing electrical wires to the light projection means and the means for circulating water connected to the water pipe. In this case, the means for circulating water through the tank can further comprise a basin mounted near the bottom of the tank and around the central core, the central core being of a height approximately equal to a desired water level within the tank; a pump; a first water line connected from the basin to the pump; and a second water line connected from the pump to the water pipe in the central core.

DESCRIPTION OF THE PREFERRED EMBODIMENT

Figure 1:
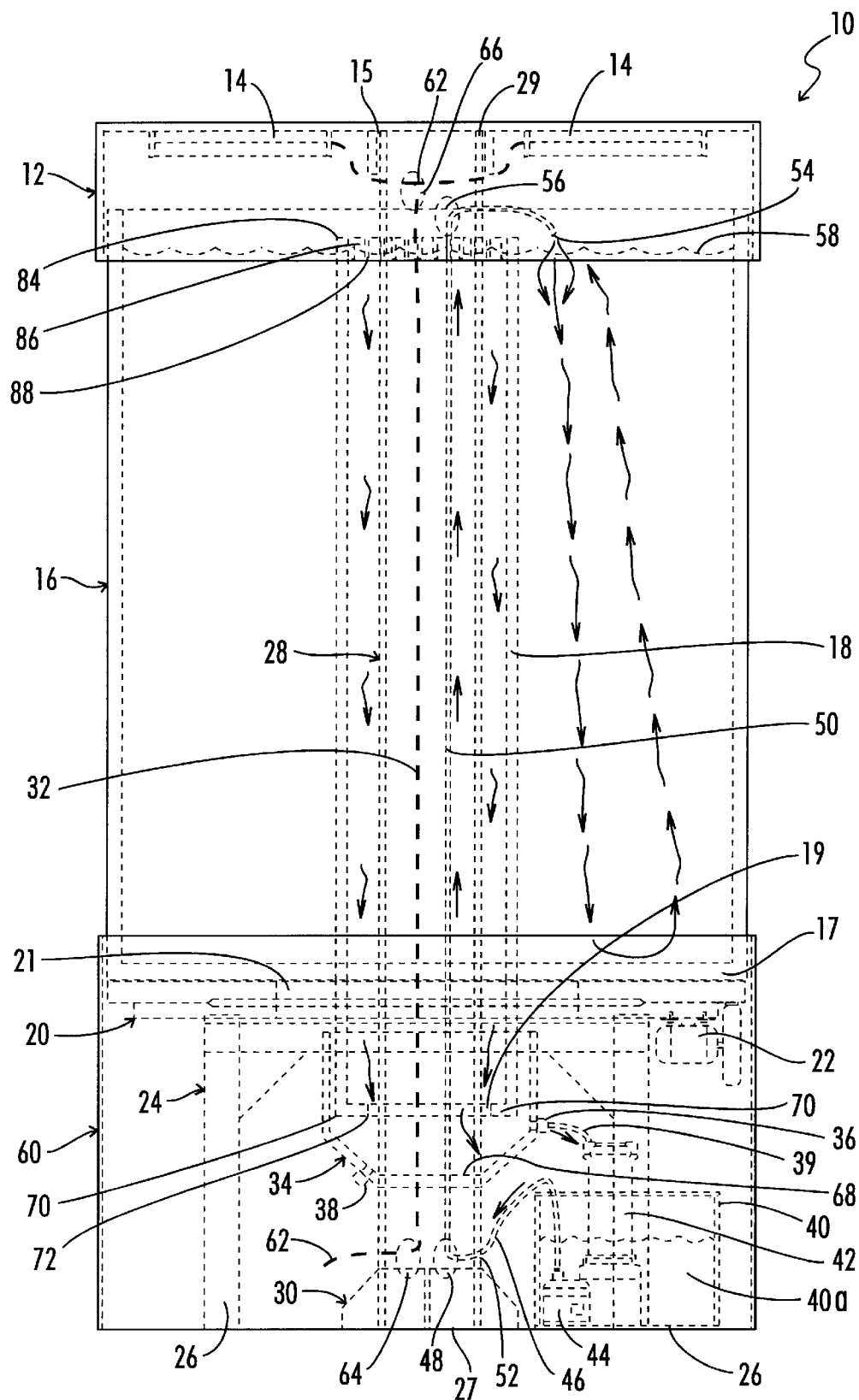
FIG. 1 is a cut-away side view of the rotating aquarium of the present invention.
Figure 2:
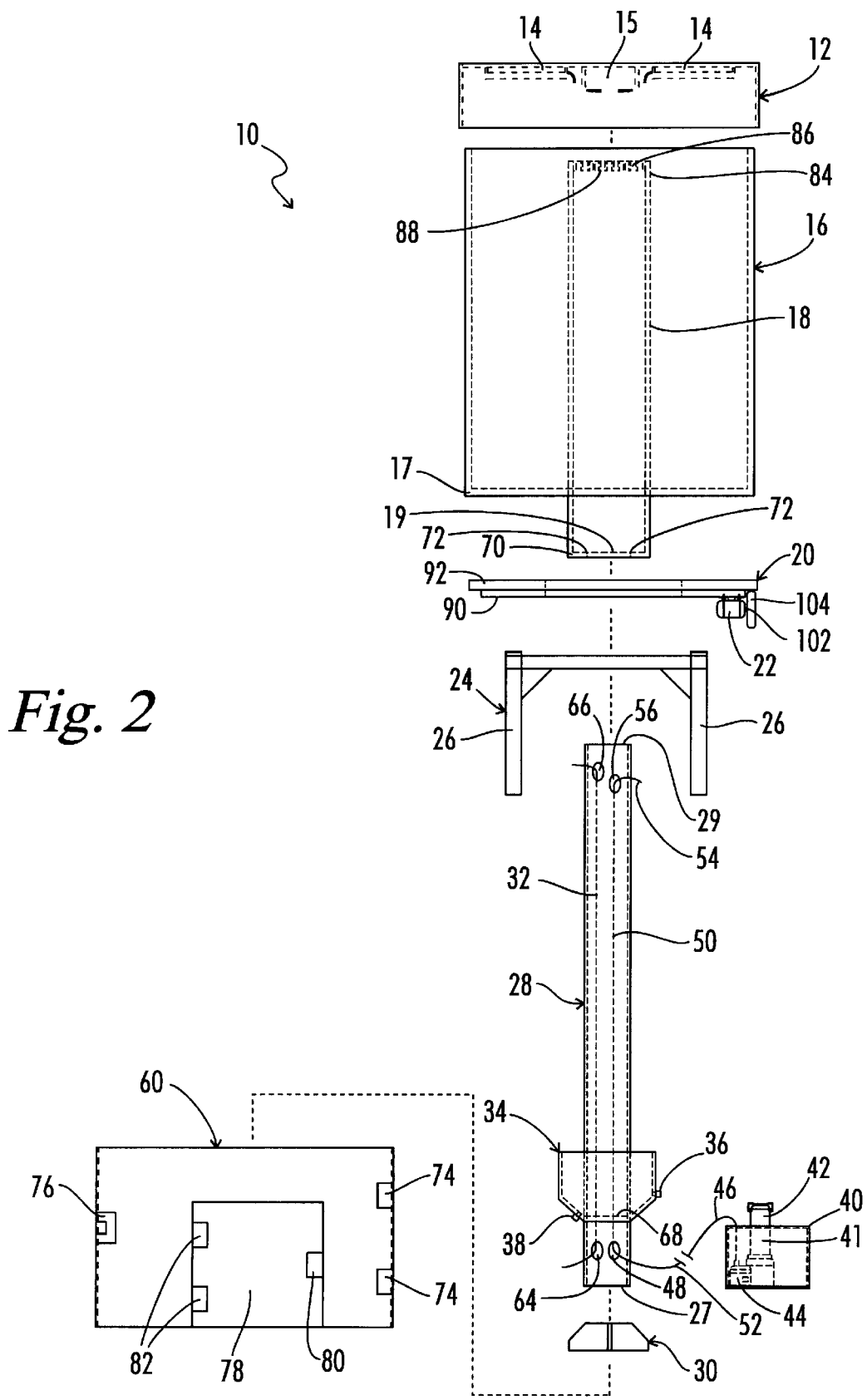
FIG. 2 is a exploded cut-away side view of the rotating aquarium of the present invention.
Figure 3:
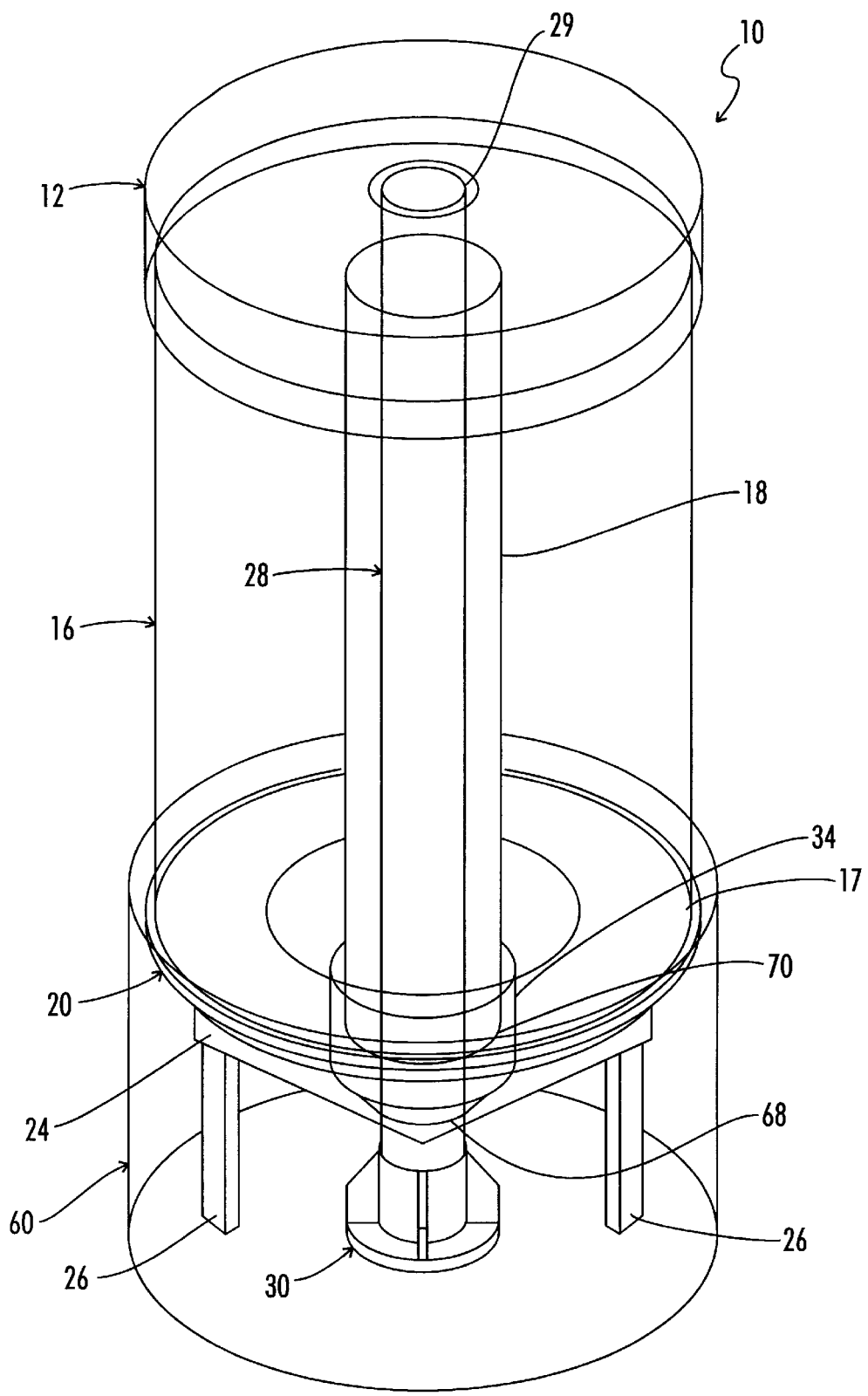
FIG. 3 is a perspective view of the rotating aquarium of the present invention.

Referring now to the drawings wherein like numerals refer to like parts throughout, the aquarium of this invention is referred to generally at 10. Referring particularly to FIGS. 1, 2 and 3, aquarium 10 comprises a canopy 12, a tank 16, a turn table 20, a tank support base 24, a canopy support cylinder 28, a water overflow basin 34, and a base cover 60.

Continuing on FIGS. 1, 2 and 3, canopy 12 is a larger diameter than tank 16 and is mounted on the top of tank 16. Tank 16 is preferably cylindrical and made of acrylic and includes a hollow center core/overflow 18. Preferably, canopy 12 extends down to the top of core 18. The bottom 70 of core 18 protrudes from a distance from the bottom 17 of tank 16 and extends into a central hole 21 of turn table 20 and ultimately rests within basin 34 such that the bottom 70 of core 18 is spaced away from the bottom 68 of basin 34.

Tank 16 rests on top of turn table 20 yet is unattached to turn table 20. Turn table 20 rests on top of base 24. Base 24 includes legs 26. Legs 26 can be made of angle iron, durable plastic or other similarly strong material. Legs 26 also include conventional leveling means in case the floor is unlevel. Turntable 20 comprises a lower plate 90 and an upper plate 92. The top plate 92 of turntable 20 is turned using electric motor 22. Electric motor 22 includes a motor shaft 102 and a rubber boot 104. Electric motor 22 is mounted beneath turntable 20 and the rubber boot 104 extends through lower plate 90 of turn table 20 and contacts upper plate 92 of turntable 20. Thus, motor 22 drives rubber boot 104, which in turn drives upper plate 92 of turntable 20.

Due to the laws of fluid dynamics, over time, a rotating vessel will eventually cause the liquid contained to rotate. Periodically reversing the direction of the rotation of tank 16 will allow the rotation to be reversed. As a result, electric motor 22 is reversible. This reversing can be caused a a manual switch. However, preferably, motor 22 will be reversed using timer 23. Timer 23 is a standard electric timer which will send an electronic signal to motor 22 to reverse its rotation thereby reversing rotation of turntable 20 and tank 16. The reverse in rotation will further cleanse the corals and other objects. The frequency of reverse rotation will be determined by the speed of the rotation of the water. A remote control may also be used to control the rotation.

Canopy support cylinder 28 extends through the central hole 19 in central core 18 and the top 29 of the support cylinder 28 ultimately fits within space 15 between light fixtures 14 in canopy 12. The bottom 27 of support cylinder 28 rests within base 30.

Continuing on FIG. 2, base cover 60 is made in two pieces and opens and closes via hinges 74 and latch 76. Preferably, base cover 60 is of a sufficient height so as to extend its coverage a few inches over the bottom 17 of tank 16. Base cover 60 also includes a door 78 to provide access to the filtration system and the like. Door 78 is opened and closed via handle 80 and hinges 82.

Figure 1A:
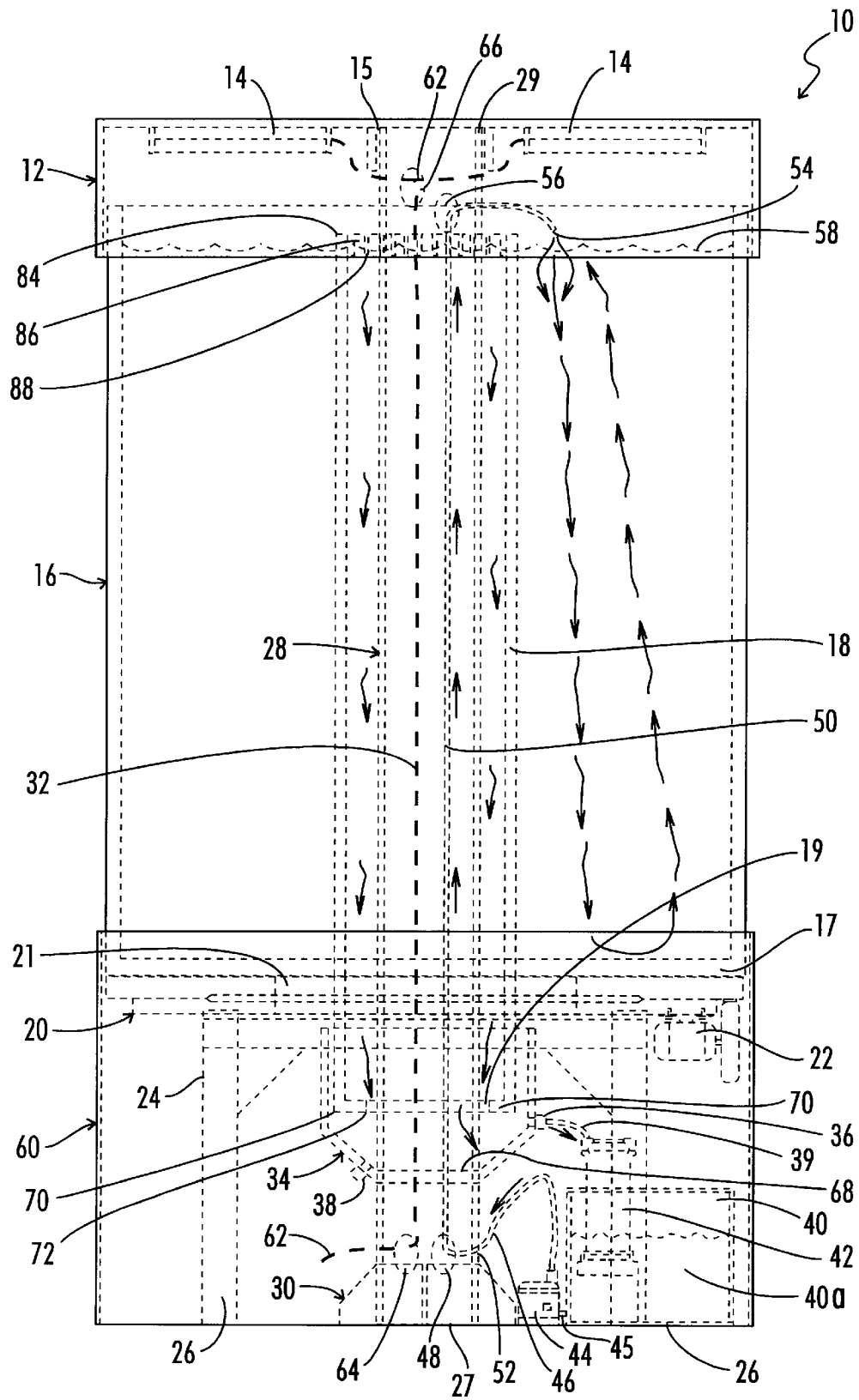
FIG. 1A is a cut-away side view of the rotating aquarium of the present invention wherein the pump is mounted externally to the reservoir.

As best seen in FIGS. 1 and 2, support cylinder 28 includes an electrical conduit 32 and water return line 50. Water overflow basin 34 includes an outlet 36 to reservoir 40 and also includes a sediment cleanout drain 38. The user can removed sediment from basin 34 via drain 38. Line 39 connects outlet 36 and reservoir 40. A filter system 42 is mounted within reservoir 40. Appropriate filters are commercially available and can include a Venturi protein skimmer and a wet/dry biological filter, among others. A pump 44 is also mounted within reservoir 40 Alternatively, as seen in FIG. 1A, pump 44 can be mounted on the exterior of reservoir 40 and can be plumbed in from the external position using a line 45. Returning now to FIGS. 1 and 2, a line 46 connects pump 44 to water return line 50 at first end 52 of water return line 50 at lower bore 48. Optionally, an ultraviolet sterilization apparatus can be plumbed in on line 46 between pump 44 and water return line 50. The second end 54 of water return line 50 extends out of upper bore 56 and is positioned over water surface 58 so that water may be returned to tank 16 as will be more fully described below.

Continuing on FIGS. 1 and 2, in the top 84 of core 18 there are formed a plurality of notches 86 around the circumference of the top 84 of core 18. Each of these notches include a low point 88. Notches 86 act to prevent fish from being drawn out of aquarium 10, as well as to facilitate water circulation.

As best seen in FIG. 1, water is circulated through aquarium 10 as follows. Water is added to aquarium 10 so that the surface of the water 58 lies just above low points 88 of notches 86. This overflow spills over low points 88 and falls through void space between core 18 and cylinder support 28 via gravity and is collected in the water overflow basin 34. Lip 72 extends from the bottom 70 of core 18 and serves to further direct water into water overflow basin 34 and also serves to prevent spillage. Water overflow basin 34 fits tightly around cylinder 28 so as to prevent leakage. Water is then directed via gravity through line 39 into filter system 42. Water flows through filter system 42 via gravity and collects in reservoir 40.

Continuing on FIG. 1, pump 44 draws water from reservoir 40 and directs water through line 46 and into water return line 50. A supply 40a of water is maintained in reservoir 40 to insure that pump 44 does not run out of water to pump. Indeed, the user will usually need to add water to reservoir 40 to maintain water supply 40a. The action of pump 44 further directs water through water return line 50 so that it spills out of the second or top end 54 of water return line 50 and back onto water surface 58. Water is directed through water return line 50 with sufficient force to propel the water so that it reaches the bottom 17 of the tank 16. The water then circulates back to water surface 58 and spills back over low points 88 as described above. The flow of water is indicated by the arrows in FIG. 1. This vertical method of water exchange will bathe any corals living within the tank in a manner in accordance with the way the ocean currents bathe corals in the natural environment. This promotes waste transfer and nutrient delivery; and thus, more closely approximates the corals' natural environment.

Continuing on FIGS. 1 and 2, a power line 62 is run through lower bore 64 and into electrical conduit 32. Power line 62 continues up into electrical conduit 32 and exits through upper bore 66. Power line 62 is then split and is attached to light fixtures 14. Preferably, electrical ballasts are connected to the power lines below the tank and are mounted to timers so that the photo period, or light period, can be controlled.

Figure 4:
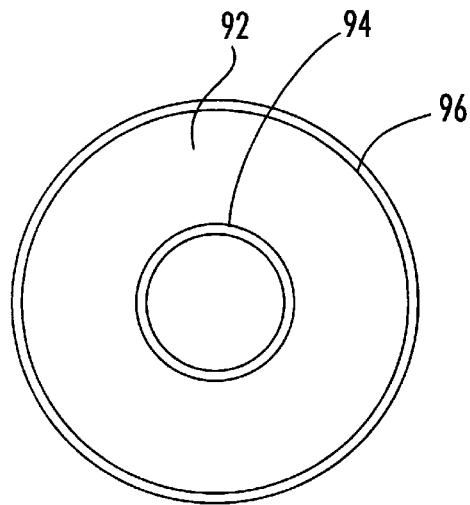
FIG. 4 is a bottom view of the top plate of the turntable of the aquarium of the present invention.
Figure 5:
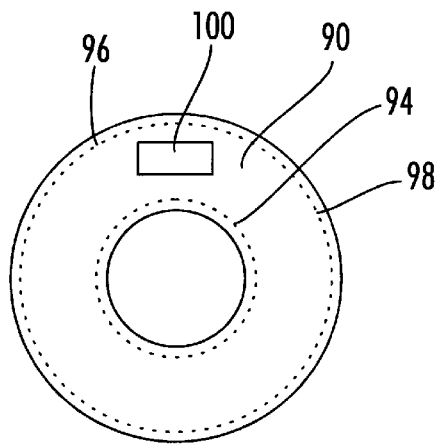
FIG. 5 is a top view of the bottom plate of the turntable of the aquarium of the present invention.

Referring now to FIGS. 4–5, the turntable 20 is described in more detail. Turntable 20 comprises a bottom plate 90 and a top plate 92. Between plates 90, 92 are oriented an inner raceway 94 of ball bearings 98 and an outer raceway 96 of ball bearings 98. A notch 100 is formed in lower plate 90. Rubber boot 104 (as seen in FIGS. 1 and 2) of motor 22 passes through notch 100 to contact top plate 92. The outer raceway 96 of ball bearings 98 is preferably 2" from the outside edge of the bottom plate 90 of turntable 20. Inner raceway 94 of ball bearings 98 are preferably about 1" from the central hole 21 in turntable 20. Ball bearings 98 and turntable 20 are also preferably stainless steel.

Aquarium 10 is depicted in the Figures as a cylindrical tank, but can also be hexagonal or square. Indeed, other shapes would be apparent to one having ordinary skill in the art after reviewing the disclosure of this invention.

Figure 6:
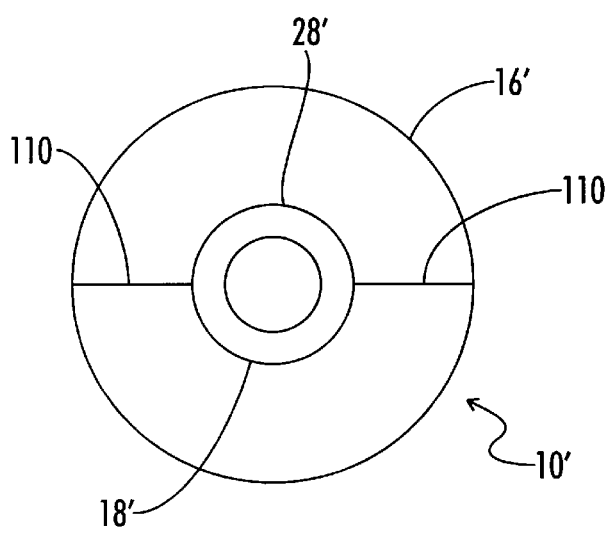
FIG. 6 is a top view of an alternative embodiment of the aquarium of the present invention wherein the aquarium is divided into two compartments by a wall.
Figure 7:
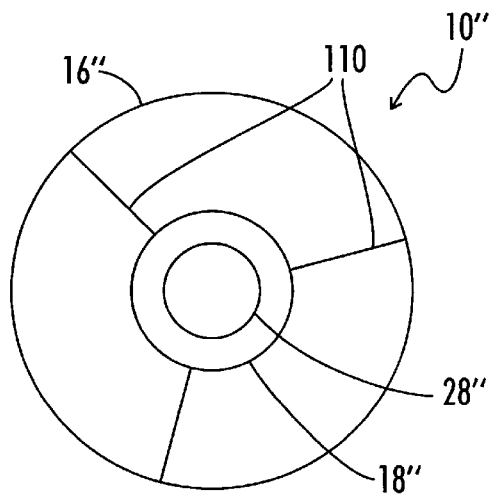
FIG. 7 is a top view of an alternative embodiment of the aquarium of the present invention wherein the aquarium is divided into three sections by walls.
Figure 8:
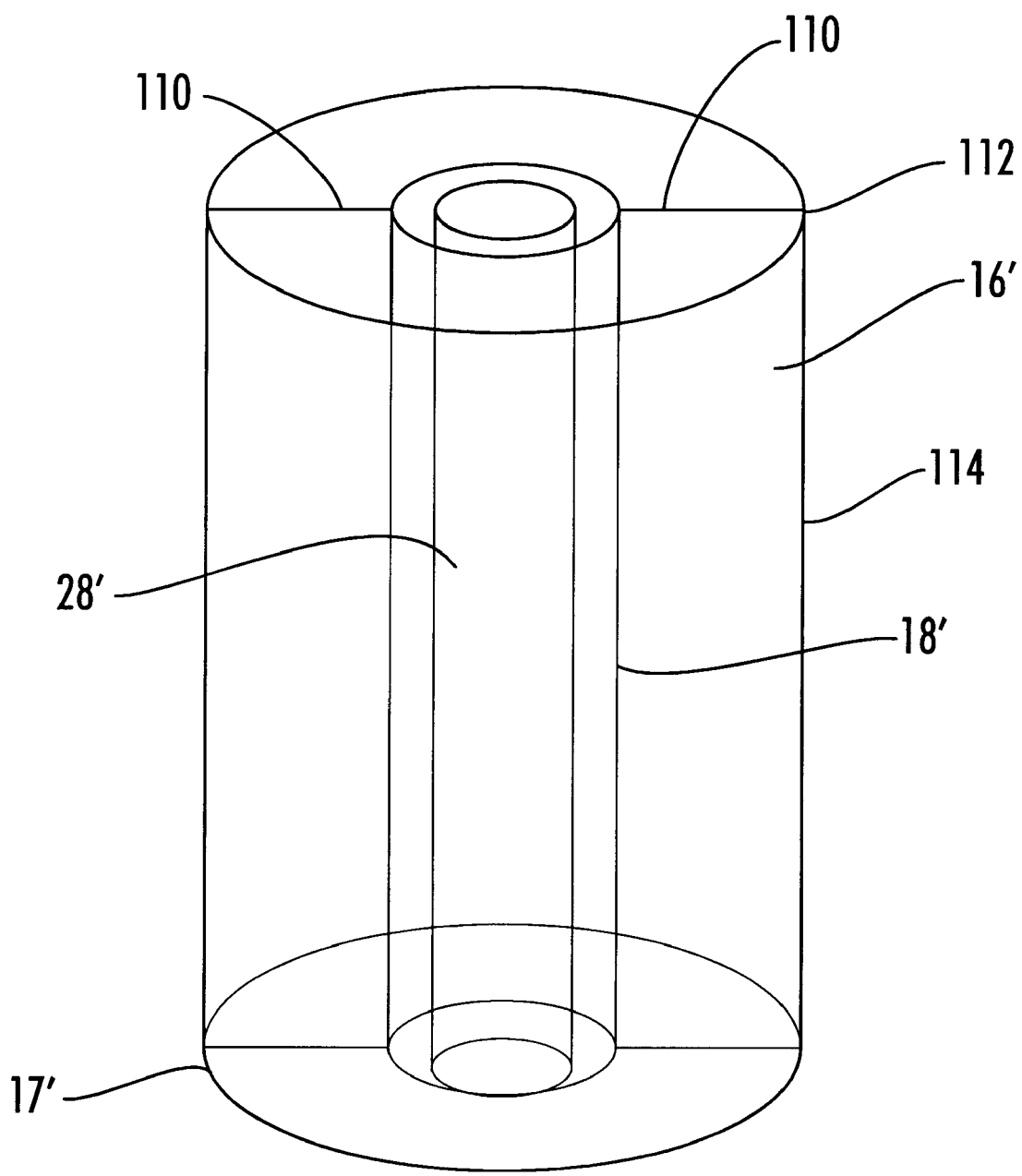
FIG. 8 is a perspective view of the tank of the alternative embodiment of the aquarium of the present invention that is presented in FIG. 6.

Referring now to FIGS. 6–8, alternative embodiments of 10' and 10" of the aquarium of this invention are depicted. Alternative embodiments 10' and 10' are split aquariums. Referring particularly to FIG. 6, aquarium 10' includes divider wall 110 which divides aquarium 10' into two reservoirs. FIG. 6 also shows support cylinder 28'. Tank 16' is divided by divider wall 100 extending from center core 18'. In FIG. 7, alternative embodiment 10" includes three divider walls 110 and thus divides tank 16 into three compartments. Walls 110 are preferably clear and, as best seen in FIGS. 7 and 8, extend to from the top 112 of tank 16' and 16" to the bottom 17' of tank 16' and 16" and are attached between outer wall 114 of tank 16' and 16" and center core 18' and 18", which surrounds support cylinder 28" The water circulation procedure and rotation for these embodiments of the invention is the same as described above. In providing such embodiments, the user is now able to keep aggressive and passive fish in the same aquarium.

To describe the action of aquarium, aquarium 10 revolves under light fixtures 14. As this occurs, the corals receive light in much the same way that corals receive light in the ocean as the earth rotates about its axis as it travels around the sun. That is, the angle of the radials of light change as the aquarium slowly turns. This allows lower coral branches to receive light that would have been blocked by the upper branches of the coral in the conventional aquarium.

Conversely, the light source can be an external light source of any configuration. For example, a side lighting can be used that is attached to or separate from the tank.

The user can assemble corals within the tank as follows. Living stones, pieces of rock taken from the ocean, are stacked on top of each other from the bottom 17 of tank 16 in a stable manner until the rocks are stacked at a point about two-thirds from to the top of the tank 16. Living corals are placed in a secure manner on the ledges created by these stacked rock. The water level is then filled until it reaches the low points 88 of notches 86 in central core 18. Thus, by carefully stacking the rock and placing the coral in different locations, the user will be able to appreciate the different views of the aquarium as it rotates.

Alternatively, and depending on the preference of the user, water circulation can be controlled with valves so that stronger currents can be generated closer to corals that like stronger water movement. Further, weaker currents can be generated closer to corals that survive better under such weaker currents.

A variety of lighting is acceptable, depending on the preference of the user and depending on the species of coral. Suitable lighting fixtures can include incandescent metal halide or high-output fluorescent. Further, lights of various colors and temperatures can be mounted at different distances from the center of the tank to generate different lighting effects within the tank.

Thus, although there have been described particular embodiments of the present invention of a new and useful rotating aquarium, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. An aquarium comprising:
   a. an aquarium tank;
   b. a motor driver turntable for rotating said aquarium; and
   c. means for circulating water through the tank.

2. The aquarium of claim 1 further comprising an exterior light source.

3. The aquarium according to claim 2 wherein the light projection means comprises a light fixture mounted on top of the tank.

4. The aquarium according to claim 2 wherein the light projection means comprises multiple light fixtures mounted on top of the tank.

5. The aquarium of claim 1 further comprising means for reversing the rotation of said turntable.

6. The aquarium according to claim 1 wherein the turntable is driven by an electric motor.

7. The aquarium according to claim 1 wherein the means for circulating the water through the tank comprise a pump and at least two water lines, the first water line transmitting water from the tank to the pump and the second water line transmitting water from the pump to the tank.

8. The aquarium according to claim 7 wherein the means for circulating the water throughout the tank further comprises a reservoir, the first water line connected to the reservoir, and the pump operatively connected to the reservoir.

9. The aquarium according to claim 7 wherein the pump is mounted within the reservoir.

10. The aquarium according to claim 7 wherein the pump is mounted externally to the reservoir.

11. The aquarium according to claim 1 wherein the tank includes a central core, the central core including a water pipe and an electrical conduit, the electrical conduit bearing electrical wires to the light projection means and the means for circulating water connected to the water pipe.

12. The aquarium according to claim 11 wherein the means for circulating water throughout the tank further comprise a basin mounted near the bottom of the tank and around the central core, the central core being of a height approximately equal to a desired water level within the tank; a pump; a first water line connected from the basin to the pump; and a second water line connected from the pump to the water pipe in the central core.

13. The aquarium according to claim 12 wherein the means for circulating the water throughout the tank further comprises a reservoir, the first water line connected to the reservoir, and the pump operatively connected to the reservoir.

14. The aquarium according to claim 13 wherein the pump is mounted within the reservoir.

15. The aquarium according to claim 13 wherein the pump is mounted externally to the reservoir.

16. The aquarium according to claim 1 further comprising walls mounted within the tank of the aquarium that divide the aquarium into compartments.

17. The aquarium according to claim 16 wherein the walls are oriented such that the means for circulating water functions for all compartments.

18. The aquarium according to claim 1 further comprising walls mounted between an outer wall of the tank and a central core.

19. A method for displaying aquatic life in a tank of an aquarium comprising:
   a. rotating said tank of said aquarium with a motor attached to said aquarium;
   b. periodically reversing the rotation of said aquarium; and
   c. circulating water through said tank of said aquarium.

20. The method of claim 19 comprising the additional step of positioning said aquarium near a light source.

21. The method of claim 19 further comprising the step of reversing the rotation of said tank.

22. An aquarium comprising:
   a. a tank;
   b. means for rotating the tank;
   c. means for circulating water through the tank;
   d. means for reversing the rotation of said means for rotating the tank; and
   e. wherein said means for reversing the rotation comprises a reversible motor.

23. The device of claim 22 further comprising a timer for controlling said reversible motor.

* * * * *